United States Patent
Xue (10) Patent No.: US 9,894,710 B2
(45) Date of Patent: Feb. 13, 2018

(54) METHOD FOR RELEASING WIRELESS LINK RESOURCE AND USER EQUIPMENT

(71) Applicant: ZTE CORPORATION, Shenzhen, Guangdong Province (CN)

(72) Inventor: Zitao Xue, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 19 days.

(21) Appl. No.: 14/898,479

(22) PCT Filed: Sep. 9, 2013

(86) PCT No.: PCT/CN2013/083103
§ 371 (c)(1),
(2) Date: Dec. 15, 2015

(87) PCT Pub. No.: WO2014/201771
PCT Pub. Date: Dec. 24, 2014

(65) Prior Publication Data
US 2016/0192437 A1  Jun. 30, 2016

(30) Foreign Application Priority Data

Jun. 17, 2013 (CN) .......................... 2013 1 0240807

(51) Int. Cl.
*H04W 76/06* (2009.01)
*H04W 76/04* (2009.01)
*H04W 52/02* (2009.01)

(52) U.S. Cl.
CPC ....... *H04W 76/06* (2013.01); *H04W 52/0209* (2013.01); *H04W 76/046* (2013.01);
(Continued)

(58) Field of Classification Search
CPC ............ H04W 76/06; H04W 52/0209; H04W 76/046; H04W 76/066; H04W 76/068; Y02B 60/50
See application file for complete search history.

(56) References Cited

U.S. PATENT DOCUMENTS

2002/0172178 A1  11/2002  Suzuki et al.
2007/0291749 A1  12/2007  Taki
(Continued)

FOREIGN PATENT DOCUMENTS

CN     101917774 A    12/2010
CN     102111856 A     6/2011
(Continued)

*Primary Examiner* — Kwang B Yao
*Assistant Examiner* — Moo Ryong Jeong
(74) *Attorney, Agent, or Firm* — Ling Wu; Stephen Yang; Ling and Yang Intellectual Property (57) ABSTRACT

A method for releasing wireless link resources and a user equipment (UE) are provided in the present document. The method includes the following steps: the UE monitoring a transport layer signaling state in a data communication process; the UE prejudging whether a corresponding condition for releasing wireless link resources is satisfied according to the detected transport layer signaling state (102); and when the condition for releasing the wireless links is satisfied, the UE sending a message used for releasing the wireless link resources (103). With the method for releasing the wireless link resources and the UE of the embodiments of the present document, the power saving effect of the UE can be improved.

6 Claims, 6 Drawing Sheets

(52) U.S. Cl.
CPC ....... *H04W 76/066* (2013.01); *H04W 76/068* (2013.01); *Y02B 60/50* (2013.01)

(56) References Cited

U.S. PATENT DOCUMENTS

| | | | |
|---|---|---|---|
| 2008/0198871 A1 | 8/2008 | Shahidi et al. | |
| 2009/0323632 A1* | 12/2009 | Nix | H04L 29/125 370/331 |
| 2012/0151041 A1* | 6/2012 | Gerber | H04L 43/0876 709/224 |
| 2013/0279385 A1* | 10/2013 | Meylan | H04W 52/0225 370/311 |

FOREIGN PATENT DOCUMENTS

| | | |
|---|---|---|
| CN | 102724770 A | 10/2012 |
| WO | WO2011021152 A | 2/2011 |

* cited by examiner

METHOD FOR RELEASING WIRELESS LINK RESOURCE AND USER EQUIPMENT

TECHNICAL FIELD

The present document relates to the field of communication, and particularly, to a method for releasing wireless link resources and a user equipment.

BACKGROUND

Smartphones have been very popularized at present, and meanwhile they have also completely changed people's living habits, and many people usually use a mobile phone to read the news, chat on the QQ and WeChat and refresh the microblog, but since there has been no breakthrough in the battery technology for many years, a smartphone with many functions, strong performance and a large screen faces the problem of greater power consumption. Especially the various services mentioned above all require that the network is connected, and refresh is usually automaticcaly done, that is, even though the phone is of the state of blank screen, it is also required to connect data services to acquire a message update notification of a server, thus the consumption of the battery is fast. On the other hand, a variety of data services also cause a great load problem to the network, and excessively frequent service establishments and releases resulted from such data services enormously influence the networks of various operators. Therefore, many terminal or chip manufacturers bring out many power saving measures, and the present patent relates to an effective power saving means.

Many dormancy policies in the data communication process are defined in both the 3GPP wireless organization and the 3GPP2 wireless organization, and the same characteristic thereof is temporarily communicating to maintain links of related data communication modules of the network side, and rarer wireless link resources are released or reestablished through the appropriate policy, so as to achieve the two objects of saving the network resources and saving the terminal nodes. For example, it is the Fast Dormancy defined in the 3GPP or the Dormancy mechanism defined in the 3GPP2.

The Fast Dormancy is a policy for the terminal dormancy defined in the 3GPP, and it is divided into two stages, the first stage is that only the Release 7 or a release before the Release 7 is supported at the terminal and a certain terminal of the network, and it is called as the Pre-R8 Fast Dormancy, and the characteristic thereof is only informing the network of temporarily disconnecting a service connection but not informing the network of the cause of disconnection; and the second stage is that both the network and the terminal are releases after the Release 8, and the characteristic thereof is that, when it is to apply to the network for disconnecting a wireless service connection, a cause code field is carried in the meantime, and the network is informed of the cause of disconnecting the wireless service connection. At present, the Fast Dormancy has only defined its signaling flow at an RRC layer and not definitely described its policies at the upper layer, and the policy adopted by most of the terminal manufacturers is that, in a certain scenario (such as the blank screen), if the terminal does not have data transmission for a period of time, the Fast Dormancy is called at the bottom layer to disconnect wireless links corresponding to the data communication.

Today the smartphones or tablet computers have been extremely popular, and the explosive growth also emerges in the data services, but there has been no new breakthrough in the battery technology, and the capability of the terminal keeping continuous work has faced great challenges, but the power saving effect of the terminal in the prior art is still not ideal enough.

A Transport Layer is the most important and most crucial layer in the OSI, and it is the unique layer responsible for the overall data transmission and data control. The transport layer provides an end-to-end data exchange mechanism, and checks group serial numbers and sequences. The transport layer provides reliable transmission services for the upper three layers thereof such as a session layer and so on, and provides reliable destination site information for a network layer.

The task of the transport layer is to optimally utilize the network resources to provide the function of establishing, maintaining and canceling a transmission connection between the session layers of two end systems according to characteristics of the communication subnetwork, and take charge of the reliable end-to-end data transmission. At the layer, a protocol data unit for information transmission is called as a segment or message.

Major Functions:

Provide transmission services for the end-to-end connection, and the transmission services are divided into a reliable transmission service and an unreliable transmission service, wherein a Transmission Control Protocol (TCP) is for the typical reliable transmission, and a User Data Protocol (UDP) is for the unreliable transmission.

Provide management services such as traffic control, error control and Quality of Service (QoS) for the end-to-end connection.

The transport layer mainly contains the following several protocols: a TCP, a UDP, SPX, a NetBIOS and NetBEUI, wherein, the SPX protocol has been rarely used, and is now only applied sometimes in the security industry and paging industry at present. The NetBIOS protocol is developed by IBM Corporation, which is mainly used for a small-sized local area network with tens of computers. The NetBIOS protocol is hardly used in the internet. The NetBEUI is an improvement based on the NetBIOS, which is of the similar situation. What are widely adopted in the internet at present is mainly the TCP protocol and the UDP protocol, wherein the TCP protocol is adopted in most of the scenarios, and the characteristic of the TCP protocol is that there is an establishment and release process, and there is a response mechanism in a message transmission process, and the message integrity is good; and the characteristic of the UDP protocol is that there is no establishment and release process, and a message transmission process does not have a response mechanism, and the message transmission delay is small, but the integrity is not guaranteed. On this point, the situation of the mobile internet is basically identical with that of the internet.

SUMMARY

The technical problem required to be solved by the present document is to provide a method for releasing wireless link resources and a user equipment, to solve the technical problem that a power saving effect of the user equipment is not ideal enough.

In order to solve the above technical problem, the present document provides a method for releasing wireless link resources, which comprises:

a user equipment monitoring a transport layer signaling state in a data communication process;

the user equipment prejudging whether a corresponding condition for releasing wireless link resources is satisfied according to a detected transport layer signaling state; and when the condition for releasing the wireless link resources is satisfied, the user equipment sending a message used for releasing the wireless link resources.

Preferably, the transport layer signaling state is that only UDP signalings are contained, and the condition for releasing the wireless link resources is that:

a last UDP signaling is sent by the user equipment, and it reaches a first preset time after a sending moment of the last UDP signaling; or a last UDP signaling is received by the user equipment, and it reaches a second preset time after a receiving moment of the last UDP signaling.

Preferably, the transport layer signaling state is that only TCP signalings are contained, and the condition for releasing the wireless link resources is that: all TCP ports are closed.

Preferably, the transport layer signaling state is that UDP signalings and TCP signalings are simultaneously contained, and the condition for releasing the wireless link resources is that:

a last UDP signaling is sent by the user equipment, and it reaches a first moment and a later moment in moments that all TCP ports are closed, wherein, the first moment is a moment of reaching a first preset time after a sending moment of the last UDP signaling; or, a last UDP signaling is received by the user equipment, and it reaches a second moment and a later moment in moments that all TCP ports are closed, wherein, the second moment is a moment of a second preset time after a receiving moment of the last UDP signaling.

In order to solve the above technical problem, the present document further provides a user equipment, which comprises:

a signaling state detection unit, configured to: monitor a transport layer signaling state in a data communication process;

a condition prejudgment unit, configured to: prejudge whether a corresponding condition for releasing wireless link resources is satisfied according to a detected transport layer signaling state; and a release message sending unit, configured to: when the condition for releasing the wireless link resources is satisfied, send a message used for releasing the wireless link resources.

Preferably, the transport layer signaling state is that only UDP signalings are contained, and the condition for releasing the wireless link resources is that:

a last UDP signaling is sent by the user equipment, and it reaches a first preset time after a sending moment of the last UDP signaling; or a last UDP signaling is received by the user equipment, and it reaches a second preset time after a receiving moment of the last UDP signaling.

Preferably, the transport layer signaling state is that only TCP signalings are contained, and the condition for releasing the wireless link resources is that: all TCP ports are closed.

Preferably, the transport layer signaling state is that UDP signalings and TCP signalings are simultaneously contained, and the condition for releasing the wireless link resources is that:

a last UDP signaling is sent by the user equipment, and it reaches a first moment and a later moment in moments that all TCP ports are closed, wherein, the first moment is a moment of reaching a first preset time after a sending moment of the last UDP signaling; or, a last UDP signaling is received by the user equipment, and it reaches a second moment and a later moment in moments that all TCP ports are closed, wherein, the second moment is a moment of a second preset time after a receiving moment of the last UDP signaling.

In the method for releasing the wireless link resources and the user equipment of the embodiments of the present document, by monitoring a transport layer signaling state in a data communication process, it is to prejudge whether a corresponding condition for releasing the wireless link resources is satisfied, and send a message used for releasing the wireless link resources when the condition is satisfied, that is, a wireless link state is modified by deciding the transport layer signaling state, which ultimately achieves the object of power saving of the terminal and efficient utilization of the wireless network resources.

PREFERRED EMBODIMENTS OF THE DOCUMENT

The technical scheme of the present document will be further described in detail in combination with the accompanying drawings and specific embodiments below, so that the people skilled in the art can better understand the present document and implement the present document, but the illustrated embodiments are not a limitation to the present document. It should be noted that the embodiments in the present document and the characteristics in the embodiments can be combined with each other in the condition of no conflict.

Embodiment 1

Figure 1:
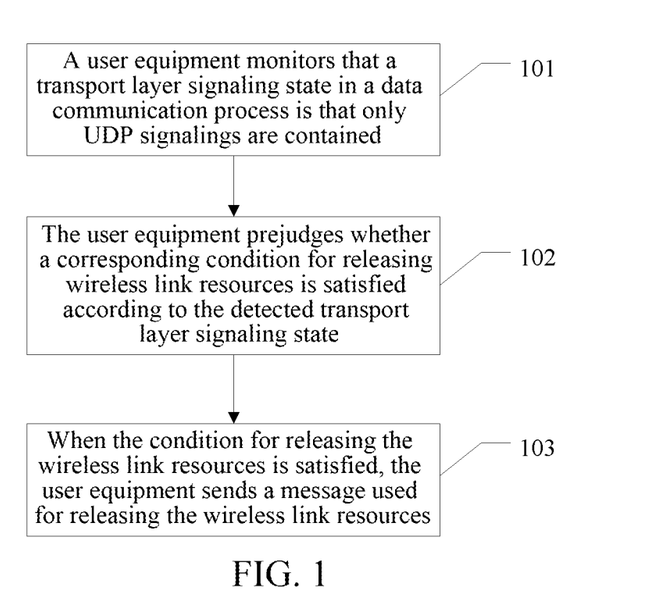
FIG. 1 is a schematic diagram of a method for releasing wireless link resources according to the embodiment 1 of the present document.

A method for releasing wireless link resources according to the embodiment 1 of the present document is as shown in FIG. 1, and the method includes the following steps.

In step 101, a user equipment monitors that a transport layer signaling state in a data communication process is that only UDP signalings are contained.

In step 102, the user equipment prejudges whether a corresponding condition for releasing wireless link resources is satisfied according to the detected transport layer signaling state.

In the embodiment 1, the transport layer signaling state is that only the UDP signalings are contained, and the condition for releasing the wireless link resources is that:

a last UDP signaling is sent by the user equipment, and it reaches a first preset time after a sending moment of the last UDP signaling; or a last UDP signaling is received by the user equipment, and it reaches a second preset time after a receiving moment of the last UDP signaling.

In step 103, when the condition for releasing the wireless link resources is satisfied, the user equipment sends a message used for releasing the wireless link resources.

The message sent by the user equipment can be a request message for releasing the wireless link resources, and it also can be a notification message for notifying the network side of that it is suitable for releasing the wireless link resources at present, and the present document does not make specific limitation on this.

Embodiment 2

Figure 2:
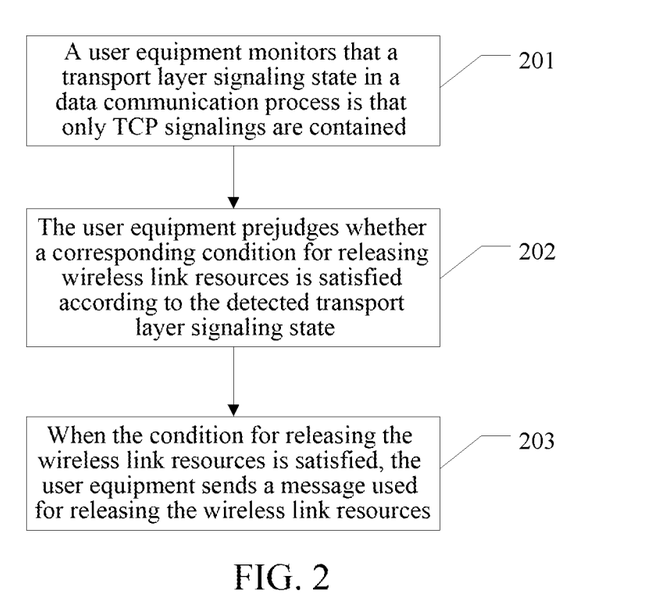
FIG. 2 is a schematic diagram of a method for releasing wireless link resources according to the embodiment 2 of the present document.

A method for releasing wireless link resources according to the embodiment 2 of the present document is as shown in FIG. 2, and the method includes the following steps.

In step 201, a user equipment monitors that a transport layer signaling state in a data communication process is that only TCP signalings are contained.

In step 202, the user equipment prejudges whether a corresponding condition for releasing wireless link resources is satisfied according to the detected transport layer signaling state.

In the embodiment 2, the transport layer signaling state is that only the TCP signalings are contained, and the condition for releasing the wireless link resources is that: all TCP ports are closed.

In step 203, when the condition for releasing the wireless link resources is satisfied, the user equipment sends a message used for releasing the wireless link resources.

Embodiment 3

Figure 3:
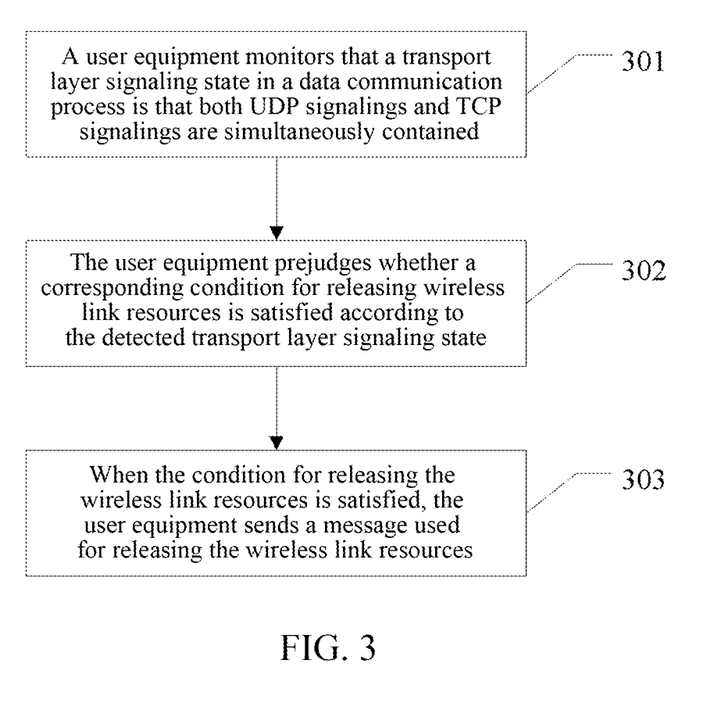
FIG. 3 is a schematic diagram of a method for releasing wireless link resources according to the embodiment 3 of the present document.

A method for releasing wireless link resources according to the embodiment 3 of the present document is as shown in FIG. 3, and the method includes the following steps.

In step 301, a user equipment monitors that a transport layer signaling state in a data communication process is that UDP signalings and TCP signalings are simultaneously contained.

In step 302, the user equipment prejudges whether a corresponding condition for releasing wireless link resources is satisfied according to the detected transport layer signaling state.

In the embodiment, the transport layer signaling state is that the UDP signalings and TCP signalings are simultaneously contained, and the condition for releasing the wireless link resources is that:

a last UDP signaling is sent by the user equipment, and it reaches a later moment of a first moment and a moment when all TCP ports are closed, wherein, the first moment is a moment of reaching a first preset time after a sending moment of the last UDP signaling; or, a last UDP signaling is received by the user equipment, and it reaches a later moment of a second moment and a moment when all TCP ports are closed, wherein, the second moment is a moment of a second preset time after a receiving moment of the last UDP signaling.

In step 303, when the condition for releasing the wireless link resources is satisfied, the user equipment sends a message used for releasing the wireless link resources.

In the method for releasing the wireless link resources according to the embodiments of the present document, in a wireless communication environment, in combination with characteristics of the protocol of the wireless link control aspect and the transport layer protocol, a wireless link state is modified by deciding the transport layer signaling state, which ultimately achieves the object of power saving of the terminal and efficient utilization of the wireless network resources. Or rather, after a data link is established, by querying a transport layer state of the terminal, especially a TCP signaling state or a UDP signaling state, the terminal prejudges a possibility of the terminal continuing to transmit data, that is, whether the data transmission of the terminal has been temporarily completed, and judges a rationality of releasing the wireless links, and then disconnects the data connection with the network by sending a management signaling of the wireless links, thereby reducing the power consumption of the terminal, and also timely releasing the wireless resources to relieve the network congestion.

Embodiment 4

Figure 4:
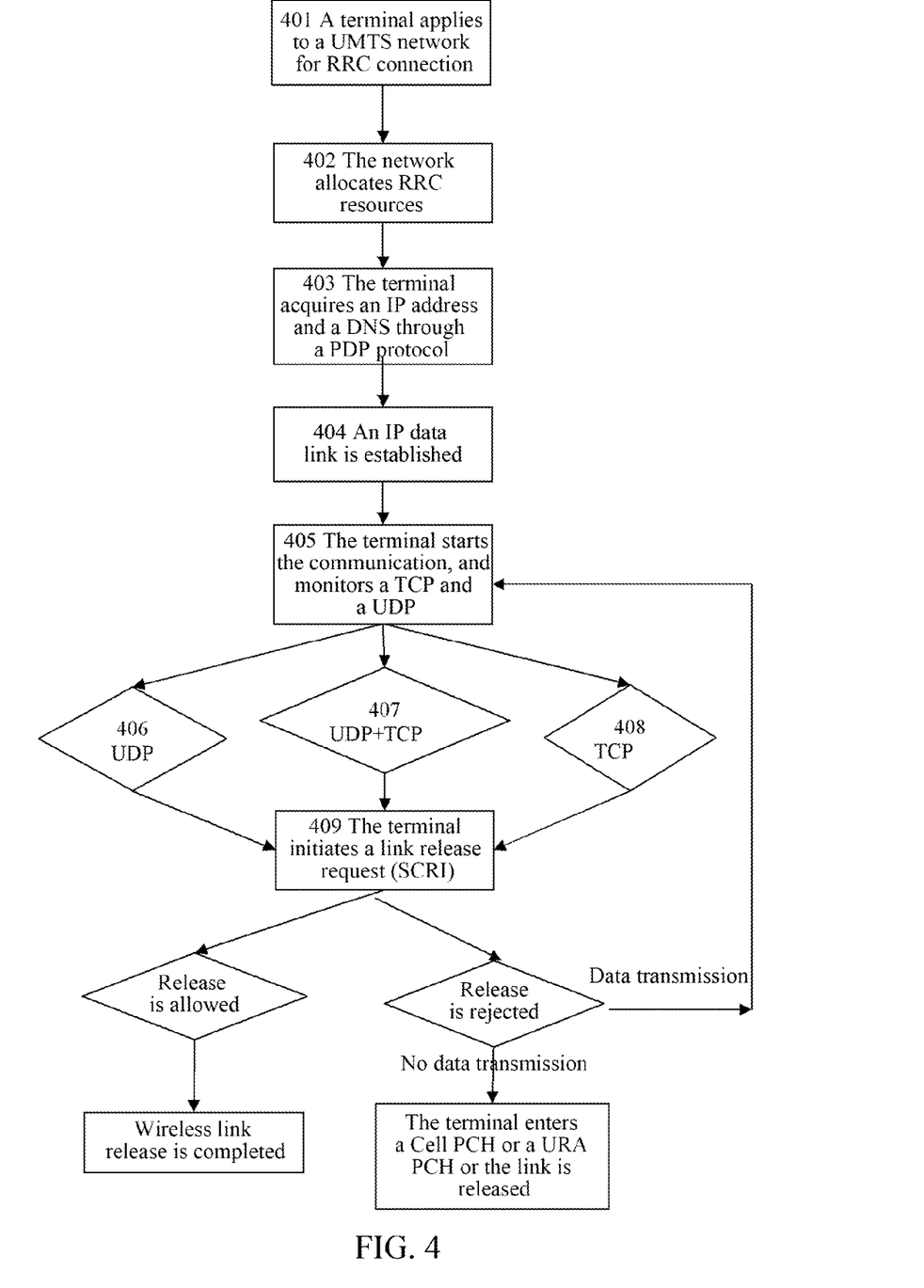
FIG. 4 is a schematic diagram of a method for releasing wireless link resources according to the embodiment 4 of the present document.

A method for releasing wireless link resources according to the embodiment 4 of the present document is based on the Fast dormancy mechanism of the Release 8 in a UMTS network, and a terminal will be described in combination with an example of various scenarios, and as shown in FIG. 4, the method includes the following steps.

In step 401, a terminal (also called a user equipment) applies to a network for wireless link resources, for example, it initiates an RRC link connection request to a UMTS network.

In step 402, the network allocates the wireless link resources to the terminal, and the terminal establishes a wireless connection with the network (for example, the terminal completes an RRC connection and an RAB connection), wherein an identity authentication process such as an authentication is contained.

In step 403, the terminal acquires an IP address and a DNS server through a PDP protocol.

If an IP message or a DNS server address natively stored by the terminal is valid, the terminal needs to apply to the network for the IP address and the DNS server address, and if an IP and a DNS address of the terminal are not expired, the original IP address and DNS server are used, and it is not required to execute the step 403.

In step 404, a data connection based on the IP is established between the terminal and the network.

In step 405, in a data communication process between the terminal and the network, a transport layer signaling state is detected.

A TCP signaling or a UDP signaling may be transmitted, or both the TCP signaling and the UDP signaling may be transmitted; if the terminal sends a TCP message request based on the IP to the network, the terminal is required to establish a TCP connection with a far-end application server.

If only the UDP signaling transmission is contained in the data communication process, step 406 is executed; if only the TCP signaling transmission is contained, step 407 is executed; and if the UDP signaling transmission and the TCP signaling transmission are simultaneously contained, step 408 is executed.

Figure 5:
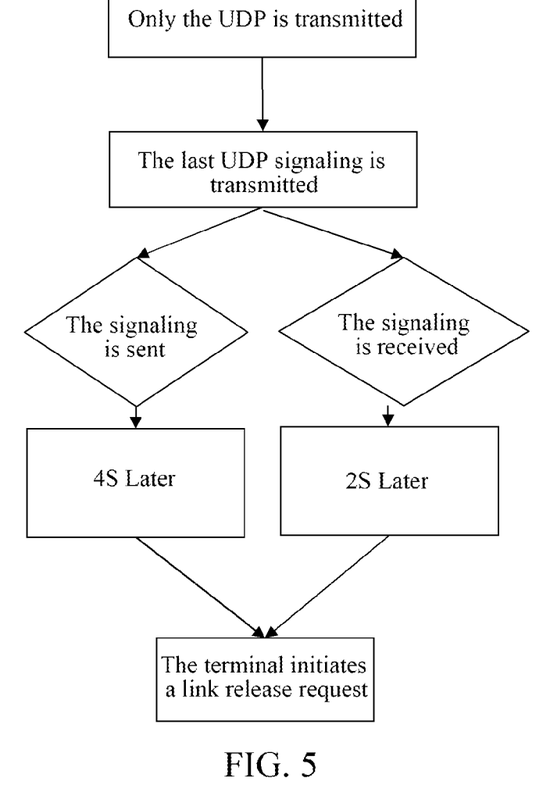
FIG. 5 is an example of a processing policy in a scenario that only UDP signalings are transmitted in the embodiment 4.

In step 406, in a scenario that only the UDP signaling transmission exists, the terminal monitors a UDP signaling transmission process. If the last UDP message is sent by the terminal, step 409 is executed T1 seconds (such as 4 seconds) after the last UDP signaling is transmitted; and if the last UDP signaling is received by the terminal, step 409 is executed T2 seconds (such as 2 seconds) after the last UDP signal is transmitted, which is specifically as shown in FIG. 5.

Understandably, values of the T1 and T2 can be determined according to the experience or statistics.

Figure 6:
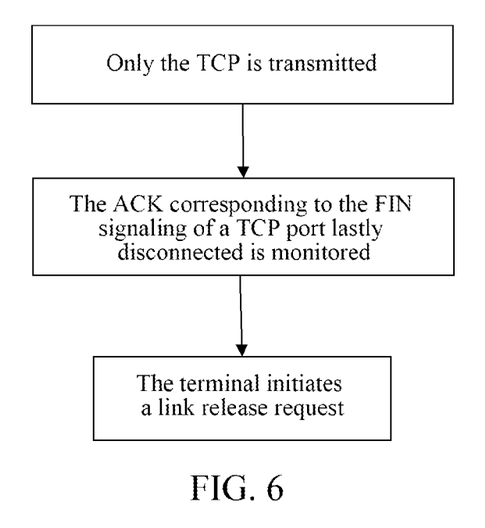
FIG. 6 is an example of a processing policy in a scenario that only TCP signalings are transmitted in the embodiment 4.

In step 407, in a scenario that only the TCP signaling transmission exists, the terminal monitors a TCP signaling transmission process. When the last TCP port is closed (that is, when it is the ACK of the second FIN), step 409 is executed, which is specifically as shown in FIG. 6.

Figure 7:
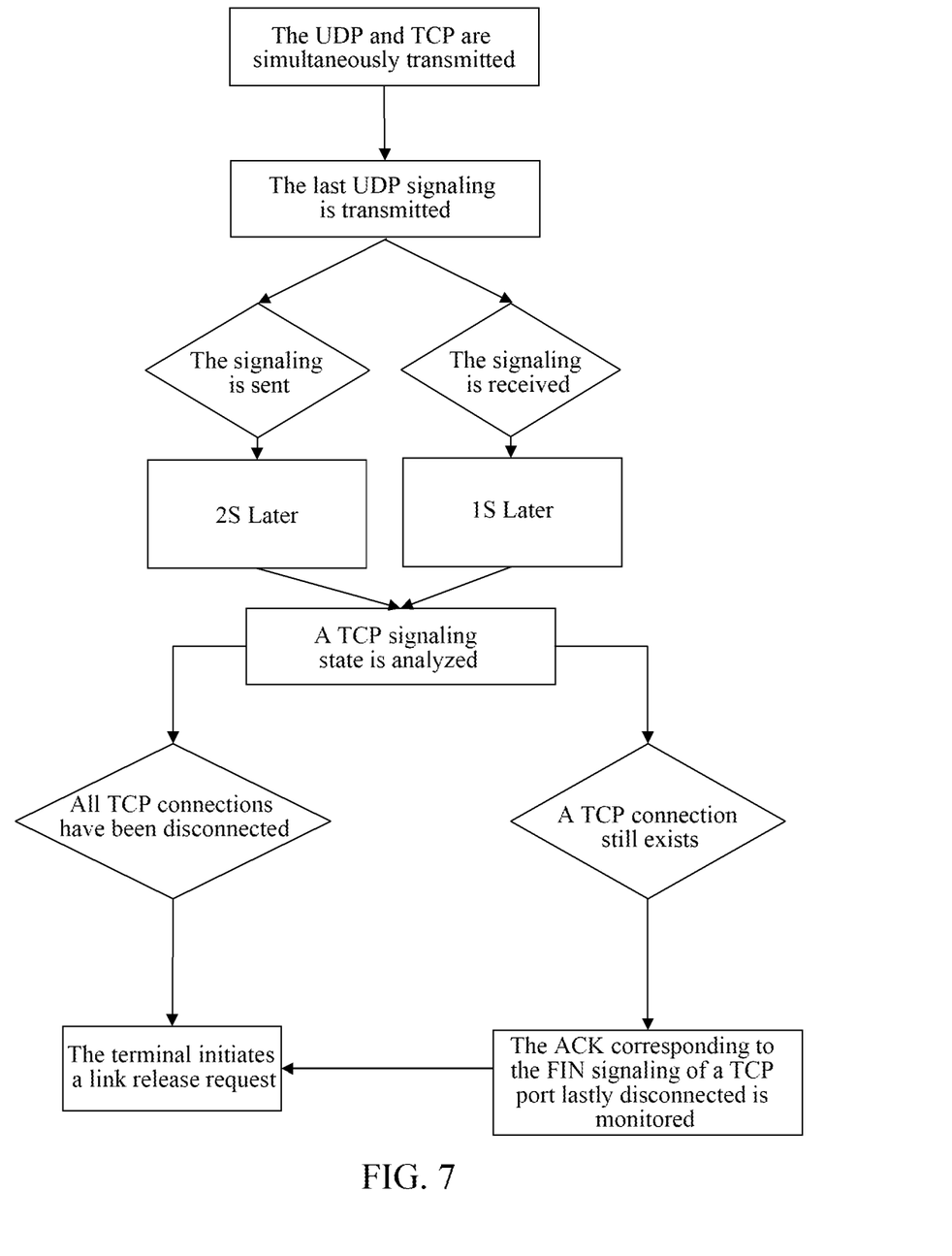
FIG. 7 is an example of a processing policy in a scenario that TCP signalings and UDP signalings are simultaneously transmitted in the embodiment 4.

In step 408, in a scenario that both the UDP signaling and the TCP transmission exist, the terminal monitors transmission states of the TCP and UDP signalings of the transport layer. With regard to the transmission process of the UDP signalings, if the last UDP signaling of the terminal is sent by the terminal, it is to compare a time T1 seconds after the last UDP signaling is transmitted and a time that all ports of the TCP are closed, and the later time point is used to execute step 409; and if the last UDP signaling of the terminal is received by the terminal, it is to compare a time T2 seconds after the last UDP signaling is transmitted and a time that all ports of the TCP are closed, and step 409 is executedaccording to the last time point, which is specifically as shown in FIG. 7.

In step 409, a message (such as an SCRI message) used for releasing the wireless link resources is promptly sent to request for disconnecting the network connection.

The network decides whether to allow the terminal to disconnect a wireless link, if the network allows the terminal to disconnect the wireless link, the wireless link is disconnected, for example, the network sends an rrcConnectionReleaseComplete message to the terminal, and the terminal also replies an rrcConnectionReleaseComplete message to the network, and the terminal enters an IDLE state; if the network does not allow the terminal to disconnect the wireless link and there are still data to continuously transmit, it jumps to the step 405; and if the network does not allow the terminal to disconnect the wireless link and no data transmission continues, the network requires the terminal to enter a Cell PCH or a URAPCH, and the subsequent mechanism is executed according to the RRC normalized definitions corresponding to the 3GPP or the network initiatively releases the link.

Figure 8:
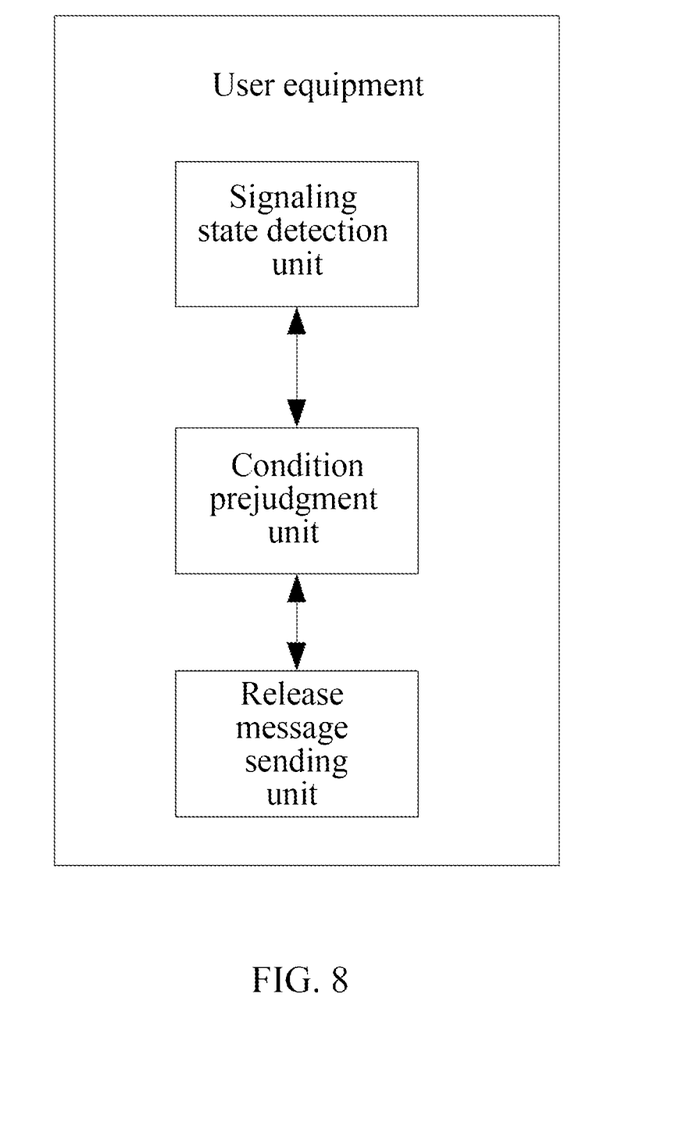
FIG. 8 is a schematic diagram of a modular structure of a user equipment according to an embodiment of the present document.

In order to implement the above method embodiment, the present document also provides a user equipment, and as shown in FIG. 8, the user equipment includes:

a signaling state detection unit, used to: monitor a transport layer signaling state in a data communication process;

a condition prejudgment unit, used to: prejudge whether a corresponding condition for releasing wireless link resources is satisfied according to the detected transport layer signaling state; and a release message sending unit, used to: when the condition for releasing the wireless link resources is satisfied, send a message used for releasing the wireless link resources.

Corresponding to the method embodiment 1, the transport layer signaling state is that only UDP signalings are contained, and the condition for releasing the wireless link resources is that:

a last UDP signaling is sent by the user equipment, and it reaches a first preset time after a sending moment of the last UDP signaling; or a last UDP signaling is received by the user equipment, and it reaches a second preset time after a receiving moment of the last UDP signaling.

Corresponding to the method embodiment 2, the transport layer signaling state is that only TCP signalings are contained, and the condition for releasing the wireless link resources is that: all TCP ports are closed.

Corresponding to the method embodiment 3, the transport layer signaling state is that UDP signalings and TCP signalings are simultaneously contained, and the condition for releasing the wireless link resources is that:

a last UDP signaling is sent by the user equipment, and it reaches a later moment of a first moment and a moment when all TCP ports are closed, wherein, the first moment is a moment of reaching a first preset time after a sending moment of the last UDP signaling; or, a last UDP signaling is received by the user equipment, and it reaches a later moment of a second moment and a moment when all TCP ports are closed, wherein, the second moment is a moment of a second preset time after a receiving moment of the last UDP signaling.

In the method for releasing the wireless link resources and the user equipment according to the present document, in the wireless communication environment, in combination with characteristics of the protocol of the wireless link control aspect and the transport layer protocol, the wireless link state is modified by deciding the transport layer signaling state, which ultimately achieves the object of power saving of the terminal and efficient utilization of the wireless network resources, and implements the efficient scheduling on the terminal, and disconnects the wireless connection in the appropriate time, and implements the method for controlling the data traffic. In the current environment where the battery life problem of the smartphones is striking and there are excessive data traffic requests for the network wireless resources at present, it has an excellent implementation effect from both the energy angle and the wireless resource angle.

INDUSTRIAL APPLICABILITY

The method of the embodiment of the present document has the following characteristics when compared to the traditional power saving measures:

in combination with the transmission state of the OSI, the upper layer protocol and the bottom protocol are combined, and the power saving effect is improved substantially;

with respect to characteristics of the UDP message and the TCP message, different policies are designed, so that the power saving measures are more reasonable and efficient;

it is applicable to all systems of wireless networks, and the compatibility is good; and it is applicable to various types of terminals, especially the intelligent terminals.

What is claimed is:

1. A method for releasing wireless link resources, comprising:

a user equipment monitoring a transport layer signaling state in a data communication process;

the user equipment determining whether a corresponding condition for releasing wireless link resources is satisfied according to a detected transport layer signaling state; and when the condition for releasing the wireless link resources is satisfied, the user equipment sending a message for releasing the wireless link resources;

wherein when the transport layer signaling state is that UDP signalings and TCP signalings are simultaneously contained, when a last UDP signaling is sent by the user equipment, the user equipment compares a first moment and a moment when all TCP ports are closed, wherein, the first moment is a moment of reaching a first preset time after a sending moment of the last UDP signaling, when a later moment out of the first moment and the moment when all TCP ports are closed is reached, the user equipment promptly sending the message for releasing the wireless link resources;

when a last UDP signaling is received by the user equipment, the user equipment compares a second moment and a moment when all TCP ports are closed, wherein, the second moment is a moment of reaching a second preset time after a receiving moment of the last UDP signaling, when a later moment out of the second moment and the moment when all TCP ports are closed is reached, the user equipment promptly sending the message for releasing the wireless link resources.

2. The method according to claim 1, wherein, when the transport layer signaling state is that only user data protocol (UDP) signalings are contained, the condition for releasing the wireless link resources is that:

a last UDP signaling is sent by the user equipment, and a first preset time after a sending moment of the last UDP signaling is reached; or a last UDP signaling is received by the user equipment, and a second preset time after a receiving moment of the last UDP signaling is reached.

3. The method according to claim 1, wherein, when the transport layer signaling state is that only transmission control protocol (TCP) signalings are contained, the condition for releasing the wireless link resources is that: all TCP ports are closed.

4. A user equipment, comprising: at least one processor configured to execute steps in a signaling state detection unit, a condition prejudgment unit, and a release message sending unit, wherein, the signaling state detection unit is configured to: monitor a transport layer signaling state in a data communication process;

the condition prejudgment unit is configured to: determine whether a corresponding condition for releasing wireless link resources is satisfied according to a detected transport layer signaling state; and the release message sending unit is configured to: when the condition for releasing the wireless link resources is satisfied, send a message for releasing the wireless link resources;

wherein when the transport layer signaling state is that UDP signalings and TCP signalings are simultaneously contained, when a last UDP signaling is sent by the user equipment, the processor is configured to compare a first moment and a moment when all TCP ports are closed, wherein, the first moment is a moment of reaching a first preset time after a sending moment of the last UDP signaling, when a later moment out of the first moment and the moment when all TCP ports are closed is reached, the user equipment promptly sending the message for releasing the wireless link resources;

when a last UDP signaling is received by the user equipment, the processor is configured to compare a second moment and a moment when all TCP ports are closed, wherein, the second moment is a moment of reaching a second preset time after a receiving moment of the last UDP signaling, when a later moment out of the second moment and the moment when all TCP ports are closed is reached, the user equipment promptly sending the message for releasing the wireless link resources.

5. The user equipment according to claim 4, wherein, when the transport layer signaling state is that only user data protocol (UDP) signalings are contained, the condition for releasing the wireless link resources is that:

a last UDP signaling is sent by the user equipment, and a first preset time after a sending moment of the last UDP signaling is reached; or a last UDP signaling is received by the user equipment, and a second preset time after a receiving moment of the last UDP signaling is reached.

6. The user equipment according to claim 4, wherein, when the transport layer signaling state is that only transmission control protocol (TCP) signalings are contained, the condition for releasing the wireless link resources is that: all TCP ports are closed.

* * * * *